United States Patent
Doyle et al.

(10) Patent No.: US 10,832,497 B2
(45) Date of Patent: Nov. 10, 2020

(54) POSITIVE CRANKCASE VENTILATION VALVE PERFORMANCE EVALUATION

(71) Applicant: International Business Machines Corporation, Armonk, NY (US)

(72) Inventors: Matthew S. Doyle, Chatfield, MN (US); Joseph Kuczynski, North Port, FL (US); Jeffrey N. Judd, Oronoco, MN (US); Timothy J. Tofil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 15/945,349

(22) Filed: Apr. 4, 2018

(65) Prior Publication Data

US 2019/0311551 A1 Oct. 10, 2019

(51) Int. Cl.
*G07C 5/00* (2006.01)
*F01M 13/00* (2006.01)
(Continued)

(52) U.S. Cl.
CPC ......... *G07C 5/006* (2013.01); *F01M 13/0011* (2013.01); *F01M 13/04* (2013.01);
(Continued)

(58) Field of Classification Search
CPC ...... G07C 5/006; G07C 5/0808; F01M 13/04; F01M 2250/00; F01M 13/0011;
(Continued)

(56) References Cited

U.S. PATENT DOCUMENTS

| 5,307,784 A | * | 5/1994 | Choma | F02M 26/50 |
| | | | | 123/568.17 |
| 6,523,531 B1 | * | 2/2003 | Feldkamp | F02D 41/0042 |
| | | | | 123/520 |

(Continued)

FOREIGN PATENT DOCUMENTS

| JP | 2009215945 A | 9/2009 |
| JP | 2014088855 A | 5/2014 |

(Continued)

OTHER PUBLICATIONS

Innocentive, *Heavy Duty Engine—Crankcase Ventilation Oil Separator Clogging*, <<https://www.innocentive.com>>, Project Room=Challenge Details, printed Aug. 3, 2017, 7 pages.

*Primary Examiner* — Babar Sarwar
(74) *Attorney, Agent, or Firm* — Nathan M. Rau

(57) ABSTRACT

A process of evaluating performance of a positive crankcase ventilation (PCV) valve is disclosed. The process includes utilizing an optical sensor coupled to the PCV valve to collect baseline valve position data during a calibration phase. The baseline valve position data represents satisfactory PCV valve performance. The process also includes utilizing the optical sensor to collect operational valve position data during an operational phase. The process further includes determining whether a deviation of the operational valve position data from the baseline valve position data satisfies a performance threshold associated with unsatisfactory PCV valve performance. When the deviation satisfies the performance threshold, the process includes communicating an error code to an alert indicator.

20 Claims, 4 Drawing Sheets

(51) Int. Cl.
  *F01M 13/04* (2006.01)
  *G01M 15/04* (2006.01)
  *G07C 5/08* (2006.01)
  *G01D 5/30* (2006.01)

(52) U.S. Cl.
  CPC ............ *G01D 5/30* (2013.01); *G01M 15/042* (2013.01); *G07C 5/0808* (2013.01); *F01M 2250/00* (2013.01)

(58) Field of Classification Search
  CPC .. G01D 5/30; G01D 5/24452; G01D 5/34792; G01M 15/042
  See application file for complete search history.

(56) References Cited

U.S. PATENT DOCUMENTS

| | | | | |
|---|---|---|---|---|
| 7,131,433 | B1 | 11/2006 | Lindberg et al. | |
| 7,198,040 | B2* | 4/2007 | Noda | F02M 25/06 123/568.15 |
| 8,020,541 | B2* | 9/2011 | Nelander | F01M 13/021 123/184.21 |
| 9,027,536 | B2* | 5/2015 | Pursifull | F02M 35/10222 123/572 |
| 9,080,525 | B2* | 7/2015 | Jankovic | F02D 41/047 |
| 9,217,343 | B2* | 12/2015 | Rice | F01M 13/0011 |
| 9,366,197 | B2* | 6/2016 | Hakeem | F02D 41/144 |
| 9,651,002 | B2* | 5/2017 | Dudar | F02M 25/0818 |
| 10,119,438 | B2* | 11/2018 | Sun | F01M 13/0011 |
| 10,408,143 | B2* | 9/2019 | Dudar | F02D 41/0032 |
| 2003/0106544 | A1* | 6/2003 | Davis, Jr. | F02D 41/0042 123/679 |
| 2004/0159299 | A1* | 8/2004 | Uchiyama | F02M 25/06 123/184.42 |
| 2004/0190047 | A1* | 9/2004 | Ito | H04N 1/00278 358/1.15 |
| 2004/0206343 | A1* | 10/2004 | Oota | F01M 13/022 123/572 |
| 2004/0261776 | A1* | 12/2004 | Knaus | F01M 13/022 123/572 |
| 2010/0031904 | A1* | 2/2010 | Matsuura | F01M 13/023 123/41.86 |
| 2011/0315125 | A1* | 12/2011 | Lohr | F02M 35/10229 123/519 |
| 2013/0087128 | A1* | 4/2013 | Valencia | F01M 13/022 123/574 |
| 2013/0268182 | A1* | 10/2013 | Treharne | F02N 11/0829 701/113 |
| 2014/0096753 | A1* | 4/2014 | Monros | F01M 13/0011 123/574 |
| 2014/0123961 | A1* | 5/2014 | Kragh | F02M 25/0836 123/520 |
| 2014/0238370 | A1* | 8/2014 | Pursifull | F02D 41/005 123/690 |
| 2014/0277996 | A1* | 9/2014 | Pierik | F02D 13/06 701/102 |
| 2014/0331979 | A1* | 11/2014 | Valencia | F01M 13/04 123/573 |
| 2014/0339000 | A1* | 11/2014 | Bidner | B60K 15/013 180/69.5 |
| 2015/0051811 | A1* | 2/2015 | Song | F02D 41/144 701/104 |
| 2015/0075503 | A1* | 3/2015 | Surnilla | F02M 25/0854 123/520 |
| 2015/0159596 | A1* | 6/2015 | Wakiya | F01M 13/00 123/41.86 |
| 2015/0322901 | A1* | 11/2015 | Kragh | F02M 25/08 123/520 |
| 2015/0345349 | A1* | 12/2015 | Monros | F01M 13/0011 123/574 |
| 2016/0169169 | A1* | 6/2016 | Mehrabi Nejad | F02M 31/18 123/557 |
| 2016/0237962 | A1* | 8/2016 | Iwazume | F02M 35/10222 |
| 2016/0363019 | A1* | 12/2016 | Warner | F02M 25/00 |
| 2017/0002761 | A1* | 1/2017 | Dudar | F02D 41/22 |
| 2017/0002776 | A1* | 1/2017 | Sun | F02M 35/10222 |
| 2017/0029352 | A1* | 2/2017 | Sookraj | C07C 51/09 |
| 2017/0082043 | A1* | 3/2017 | Dudar | F02D 41/0035 |
| 2017/0298850 | A1* | 10/2017 | Kurtz | F01N 11/007 |
| 2017/0314431 | A1* | 11/2017 | Sun | F01M 13/0011 |
| 2018/0087460 | A1* | 3/2018 | Pathan | F01M 13/04 |
| 2019/0199388 | A1* | 6/2019 | Cunningham | H04B 1/3888 |
| 2019/0210039 | A1* | 7/2019 | Kuhn | B04B 5/005 |
| 2019/0242310 | A1* | 8/2019 | Dudar | B60W 10/06 |

FOREIGN PATENT DOCUMENTS

| | | |
|---|---|---|
| JP | 2017096228 A | 6/2017 |
| KR | 19980075064 A | 11/1998 |

* cited by examiner

POSITIVE CRANKCASE VENTILATION VALVE PERFORMANCE EVALUATION

BACKGROUND

A crankcase ventilation system (CVS) is a one-way passage for gases (commonly referred to as "blow-by" gases) to escape in a controlled manner from a crankcase of an internal combustion engine. Blow-by gases (e.g., air, unburned fuel, combustion gases) are generated when gases leak from a combustion chamber past piston rings into the crankcase, causing pressure to build up inside the crankcase. The blow-by gases, if not ventilated, can condense and combine with oil vapor inside the crankcase to form sludge or cause the oil to become diluted with unburned fuel, degrading the quality of the oil and decreasing its effective life. In addition, excessive crankcase pressure may damage seals and eventually the engine. The CVS allows the blow-by gases to be vented through a positive crankcase ventilation (PCV) valve out of the crankcase.

In order to sweep fumes out of the crankcase, a crankcase "breather" is utilized to provide fresh, clean air. Typically, a crankcase air inlet is ducted directly to the engine's air cleaner, and the breather may include baffles and filters to prevent oil mist and vapor from fouling the air filter. Intake manifold vacuum is applied to the crankcase via the PCV valve, drawing fresh air into the crankcase via the breather. The airflow through the crankcase and engine interior sweeps away combustion byproduct gases. This mixture of air and crankcase gases exits through an oil baffling to exclude oil droplets, through the PCV valve and into the intake manifold. In some cases, this oil baffling is a discrete replaceable component called an "oil separator." Oil sludge may accumulate in the oil separator, resulting in increased crankcase pressure that pushes engine oil into the air intake system, eventually causing engine damage if not corrected. Engine damage may result in high costs and customer dissatisfaction with the oil separator.

The problem of oil sludge accumulating in the oil separator is typically associated with extreme operating conditions and poor oil change and/or maintenance conditions. Long idling or severe operating at low load and low speed may promote oil degradation and clog the oil separator much faster than normal. Due to the severity of the application, the standard oil change interval is not sufficient. Unfortunately, the owners/drivers of vehicles may not be aware of this problem, and some do not complete the maintenance diligently. It is also a problem that does not manifest itself under easily identifiable conditions to the driver until damage has already occurred. Accordingly, there is a need for a way to predict and/or identify oil separator failures in the field and to provide an alert/warning to the driver.

SUMMARY

According to one embodiment, a process of evaluating performance of a positive crankcase ventilation (PCV) valve is disclosed. The process includes utilizing an optical sensor coupled to the PCV valve to collect baseline valve position data during a calibration phase. The baseline valve position data represents satisfactory PCV valve performance. The process also includes utilizing the optical sensor to collect operational valve position data during an operational phase. The process further includes determining whether a deviation of the operational valve position data from the baseline valve position data satisfies a performance threshold associated with unsatisfactory PCV valve performance. When the deviation satisfies the performance threshold, the process includes communicating an error code to an alert indicator.

According to another embodiment, a PCV valve performance evaluation system includes an optical sensor coupled to a PCV valve and an engine control module (ECM) communicatively coupled to the optical sensor. The optical sensor is configured to collect baseline valve position data during a calibration phase and to collect operational valve position data during an operational phase. The baseline valve position data represents satisfactory PCV valve performance. The ECM is configured to determine whether a deviation of the operational valve position data from the baseline valve position data satisfies a performance threshold associated with unsatisfactory PCV valve performance.

According to yet another embodiment, a crankcase ventilation system is disclosed. The crankcase ventilation system includes a PCV valve and an optical sensor coupled to the PCV valve. The optical sensor is configured to collect valve position data based on visually identifiable indicators associated with the PCV valve.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

The present disclosure describes systems and methods for evaluating the performance of a positive crankcase ventilation (PCV) valve. In the present disclosure, an optical sensor may be coupled to the PCV valve to collect valve position data that may be representative of the PCV valve performance. To illustrate, during a calibration phase (e.g., during an engine "break-in" period), the optical sensor may be utilized to collect baseline valve position data representing satisfactory PCV valve performance. During an operational phase, the optical sensor may be utilized to collect operational valve position data for comparison to the baseline valve position data. When a deviation of the operational valve position data satisfies a performance threshold associated with unsatisfactory PCV valve performance, an engine control module (ECM) may generate an error code. The error code may be communicated to an alert indicator (e.g., a dashboard indicator light) in order to alert a vehicle operator of the unsatisfactory PCV valve performance.

In a particular embodiment of the present disclosure, gradations may be etched onto a plunger of a PCV valve. The gradations may be utilized by the optical sensor to "count" or otherwise identify position changes of the plunger within the PCV valve housing. In another embodiment, springs disposed within the PCV valve housing may be color-coded or otherwise visually differentiable by the optical sensor for valve position evaluation. In some embodiments of the present disclosure, the PCV valve housing may be opaque and the optical sensor connected to the housing via an orifice in the housing. In other embodiments, the PCV valve housing may be sufficiently transparent to enable valve position evaluation by the optical sensor.

Figure 1:
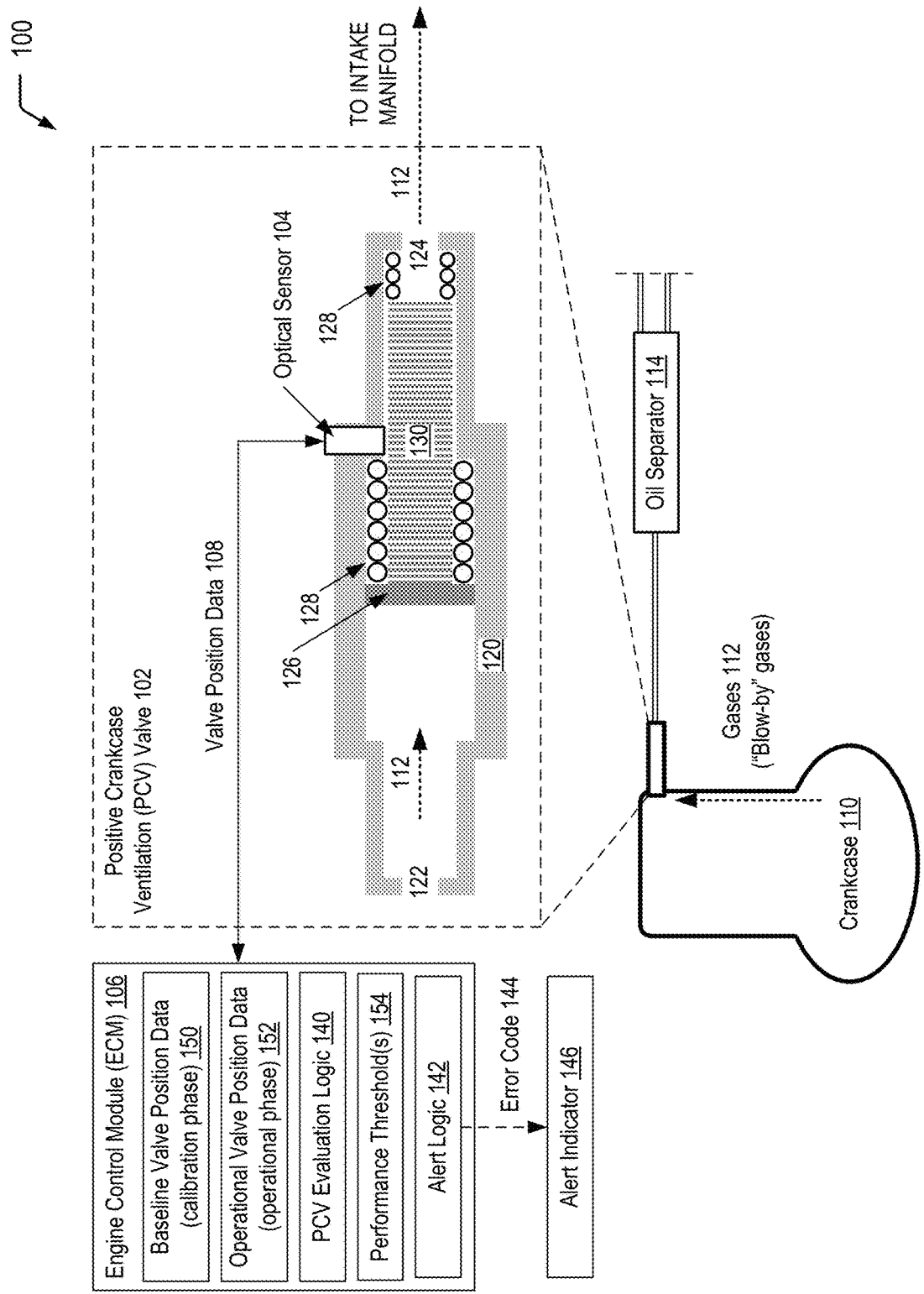
FIG. 1 is a diagram of a positive crankcase ventilation (PCV) valve performance evaluation system, according to one embodiment.

Referring to FIG. 1, a particular embodiment of a PCV valve performance evaluation system is illustrated and generally designated 100. In FIG. 1, a crankcase ventilation system includes a PCV valve 102 that is coupled to an optical sensor 104. The optical sensor 104 may be communicatively coupled to an engine control module (ECM) 106. As described further herein, the ECM 106 may be configured to utilize valve position data 108 received from the optical sensor 104 to determine valve position and/or frequency information, which may be indicative of the "health" of the PCV valve 102. When the PCV valve 102 is deemed to be operating outside of a satisfactory range, the ECM module 106 may generate an alert to enable a vehicle operator to take corrective action.

FIG. 1 depicts a crankcase 110 of an internal combustion engine, with other components of the internal combustion engine omitted for ease of illustration purposes. Gases 112 (commonly referred to as "blow-by" gases) include air, unburned fuel, and combustion gases that are generated when gases leak from a combustion chamber past piston rings into the crankcase 110, causing pressure to build up inside the crankcase 110. The crankcase ventilation system of FIG. 1 includes a one-way passage to enable the gases 112 to be vented out of the crankcase 110 through the PCV valve 102. FIG. 1 illustrates a particular embodiment in which the crankcase ventilation system further includes an oil separator 114 in fluid communication with the PCV valve 102. Oil sludge may accumulate in the oil separator 114, resulting in increased crankcase pressure that pushes engine oil into the air intake system, eventually causing engine damage if not corrected. Engine damage may result in high costs and customer dissatisfaction. The system 100 of FIG. 1 provides a way to predict and/or identify failures in the field and to provide an alert/warning to the driver.

Figure 3:
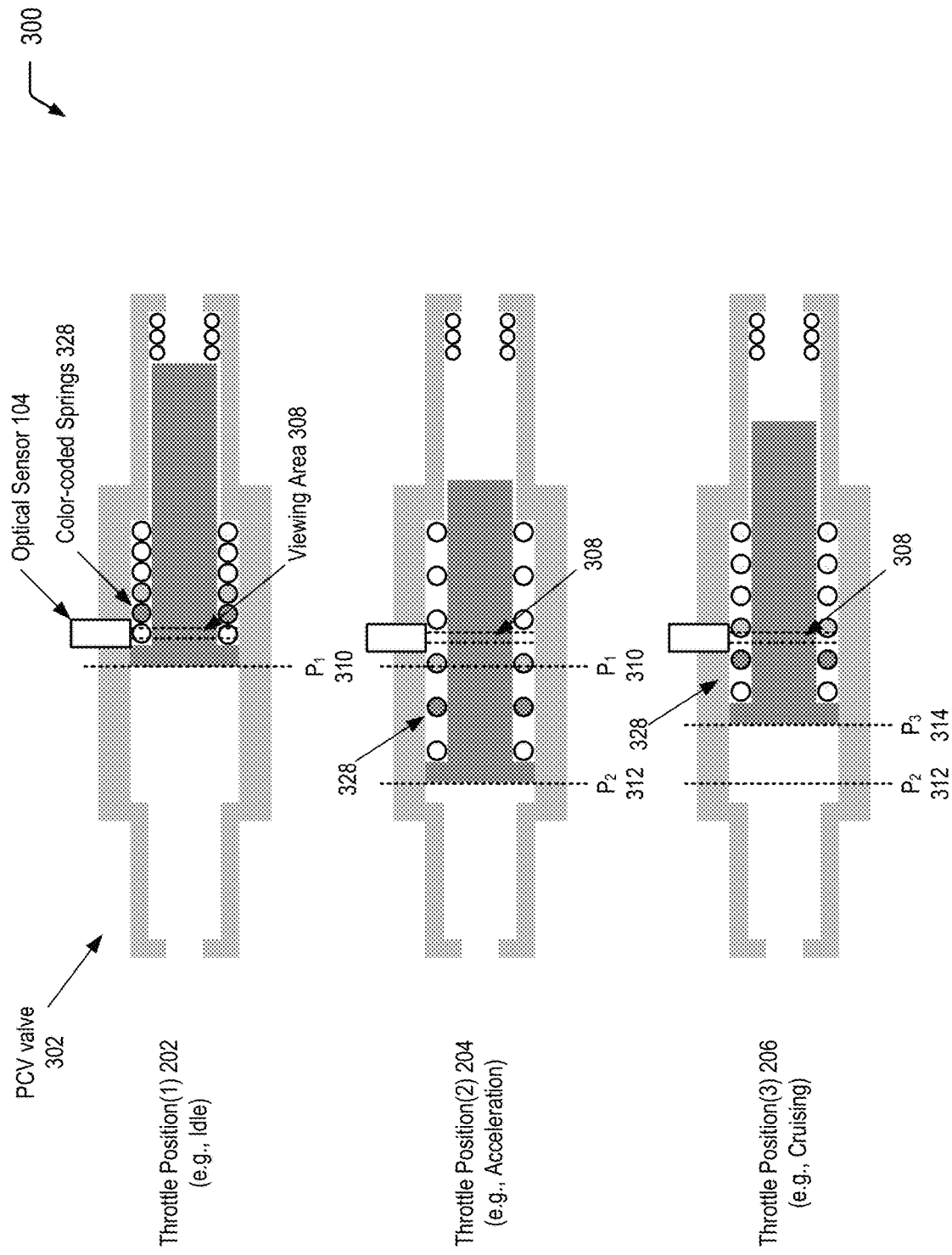
FIG. 3 illustrates a process of utilizing an optical sensor coupled to a PCV valve for PCV valve performance evaluation, according to another embodiment

The PCV valve 102 includes a housing 120 with an inlet 122 to receive the gases 112 from the crankcase 110 and an outlet 124 through which the gases 112 exit the housing 120. Within the housing 120, the PCV valve 102 includes a plunger 126 and springs 128 that enable the plunger 126 to change positions within the housing 126 depending on the particular engine operating conditions and associated intake manifold pressure. In the particular embodiment depicted in FIG. 1, the plunger 126 includes gradations 130 that may be "etched" onto the plunger 126. The gradations 130 may represent "markers" that are visually identifiable by the optical sensor 104. As described further herein, the gradations 130 may be utilized to determine the relative position of the plunger 126 within the housing 120 and/or frequency of movement of the plunger 126 under various engine operating conditions. As "gunk" or sludge accumulates on the plunger 126, its relative position or frequency in reference to the calibrated position or frequency changes. As such, changes in the relative position and/or frequency may be indicative of unsatisfactory performance of the PCV valve 102. While FIG. 1 illustrates an example in which the PCV valve 102 includes surface features that are utilized for valve position evaluation, FIG. 3 illustrates an alternative embodiment including springs 328 that are color-coded for visual identification by the optical sensor 104.

The ECM 106 includes PCV evaluation logic 140 to evaluate data from the optical sensor 104 to determine whether the valve position and/or frequency information is within an acceptable range for the PCV valve 102. The ECM 106 further includes alert logic 142 that may be configured to generate an error code 144 when the valve position and/or frequency information is outside of the acceptable range. The error code 144 may be communicated to an alert indicator 146 (e.g., a visual, audible, tactile indicator). In one embodiment, the alert indicator 146 corresponds to a "check engine" light, and the error code 144 results in illumination of the light. In another embodiment, the alert indicator 146 corresponds to an independent indicator (e.g., a "check PCV valve" light). In either case, the alert indicator 146 may alert a vehicle operator to the unsatisfactory operation of the PCV valve 102.

The optical sensor 104 is configured to collect baseline valve position data 150 during a calibration phase (e.g., an engine "break-in" period) and communicate the baseline valve position data 150 to the ECM 106. The ECM module 106 may store the baseline valve position data 150 in memory. The optical sensor 104 is further configured to collect operational valve position data 152 during an operational phase.

The ECM module 106 may utilize the PCV evaluation logic 140 to determine if a deviation of the operational valve position data 152 from the baseline valve position data 150 has occurred. The ECM module 106 may utilize the PCV evaluation logic 140 to determine whether the deviation satisfies the performance threshold(s) 154. FIG. 1 illustrates that, when the ECM module 106 determines that the deviation satisfies the performance threshold(s) 154, the ECM module 106 may utilize the alert logic 142 to generate the error code 144.

Thus, FIG. 1 illustrates an example of a PCV valve performance evaluation system. The optical sensor coupled to the PCV valve enables collection of valve position data during a calibration phase for subsequent comparison to valve position data during an operational phase. As illustrated and further described herein with respect to FIG. 2, the visually identifiable surface features depicted in FIG. 1 enable the optical sensor to determine relative valve position and/or frequency information for evaluation of the PCV valve performance.

Figure 2:
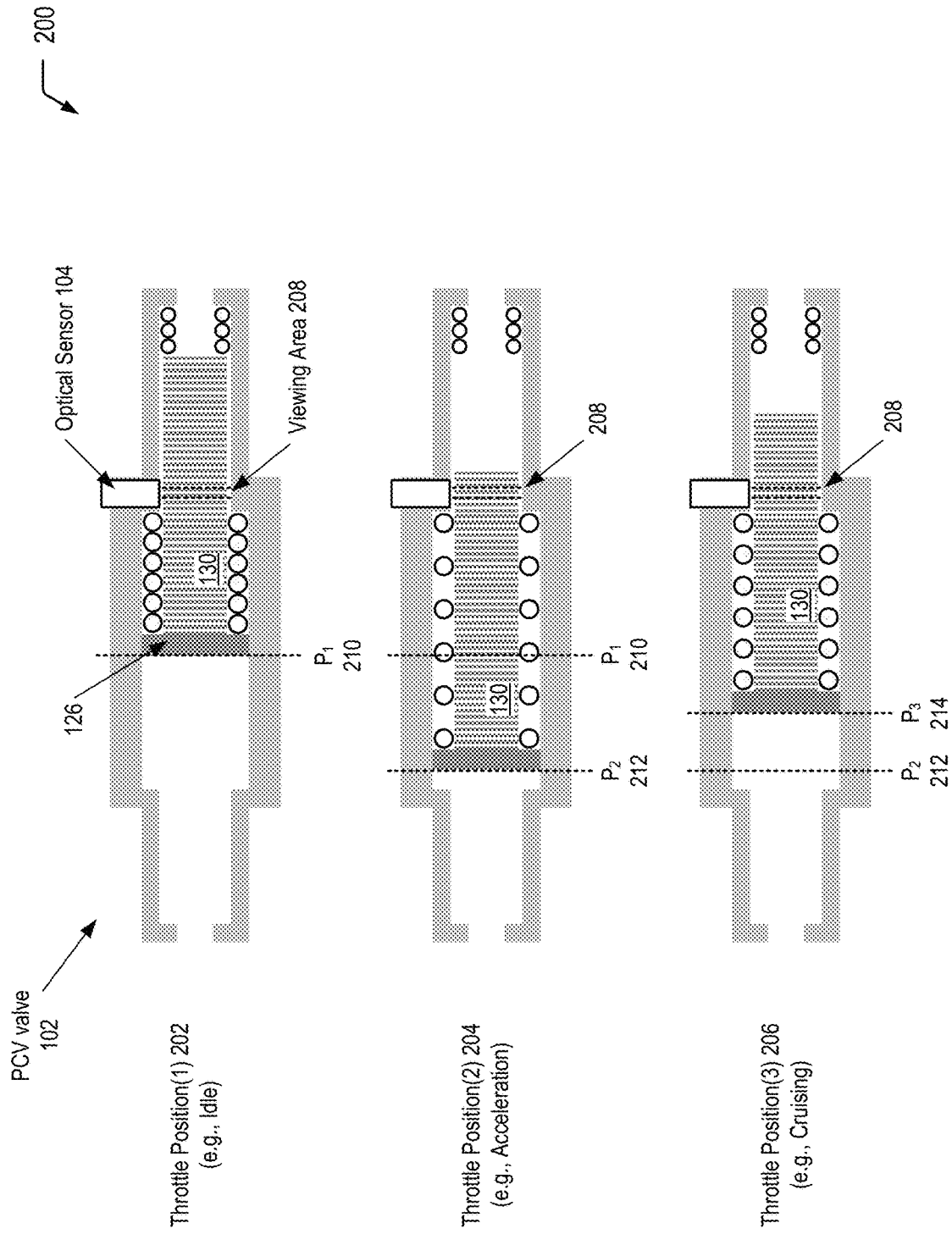
FIG. 2 illustrates a process of utilizing an optical sensor coupled to a PCV valve for PCV valve performance evaluation, according to one embodiment.

Referring to FIG. 2, a particular embodiment of a process of utilizing an optical sensor coupled to a PCV valve for PCV valve performance evaluation is illustrated and generally designated 200. In FIG. 2, the PCV valve 102 of FIG. 1 is illustrated during multiple engine operating conditions. In the particular embodiment depicted in FIG. 2, the optical sensor 104 utilizes the gradations 130 etched onto the plunger 126 to determine nominal valve position values for each of the multiple engine operating conditions. The nominal valve position values may correspond to the baseline valve position data 150 stored at the ECM module 106 of FIG. 1. Deviations from the nominal valve position values may be indicative of unsatisfactory PCV valve performance.

In the particular embodiment depicted in FIG. 2, three engine operating conditions are illustrated. It will be appreciated that alternative and/or additional engine operating conditions may be selected for evaluation purposes. The three engine operating conditions depicted in FIG. 2 correspond to a first throttle position 202 (e.g., idle), a second throttle position 204 (e.g., acceleration), and a third throttle position 206 (e.g., cruising). During a calibration phase, the optical sensor 104 may utilize the gradations 130 that pass through a viewing area 208 to determine a first nominal valve position 210 (designated as "P$_1$" in FIG. 2) at the first throttle position 202, a second nominal valve position 212 (designated as "P$_2$" in FIG. 2) at the second throttle position 204, and a third nominal valve position 214 (designated as "P$_3$" in FIG. 2) at the third throttle position 206.

In a particular embodiment, a distance between the individual gradations 130 along a plunger axis may be substantially similar. In this case, the optical sensor 104 may be configured to "count" a number of gradations on the plunger 126 that pass through the viewing area 208 as the engine operating condition transitions between each of the throttle positions 202-206. The optical sensor 104 may communicate the number of gradations to the ECM module 106, and the ECM module 106 may calculate nominal position values for the PCV valve 102 based on the number of gradations and the distance between the individual gradations 130. During a calibration phase that may correspond to an engine "break-in" period, the ECM module 106 may calculate expected nominal valve position values for each of the throttle positions 202-206 and store the values as the baseline valve position data 150. The baseline valve position data 150 may subsequently be utilized for comparison to the operational valve position data 152 in order to identify anomalous PCV valve positions.

To illustrate, the optical sensor 104 may determine that a first number of gradations pass through the viewing area 208 when the engine operating condition transitions from the first throttle position 202 to the second throttle position 204. The ECM module 106 may utilize the first number of gradations to determine the first nominal valve position 210 at the first throttle position 202 and the second nominal valve position 212 at the second throttle position 204. Additionally, the optical sensor 104 may determine that a second number of gradations pass through the viewing area 208 when the engine operating condition transitions from the second throttle position 204 to the third throttle position 206. In this case, the second number of gradations may be used to determine the third nominal valve position 214 at the third throttle position 206. It will be appreciated that a similar process may be utilized to determine nominal valve positions at alternative and/or additional throttle positions. Additionally, the frequency of detection of the gradations 130 (associated with transitions between engine operating conditions) may be utilized as alternative to nominal valve positions.

Thus, FIG. 2 illustrates an example of a process of utilizing an optical sensor coupled to a PCV valve for PCV valve performance evaluation. In the particular embodiment depicted in FIG. 2, the optical sensor may "count" a number of gradations that pass through a viewing area during transitions between various engine operating conditions. During the calibration phase, the number of gradations may be utilized to determine nominal valve position values (or frequency information) for each of the engine operating conditions. The nominal valve position values may represent satisfactory PCV valve performance, with subsequent deviations from the nominal valve position values potentially representing unsatisfactory PCV valve performance.

Referring to FIG. 3, a particular embodiment of a process of utilizing an optical sensor coupled to a PCV valve for PCV valve performance evaluation is illustrated and generally designated 300. In FIG. 3, a PCV valve 302 that may be utilized as an alternative to the PCV valve 102 of FIGS. 1 and 2 is illustrated during multiple engine operating conditions. In the particular embodiment depicted in FIG. 3, the optical sensor 104 utilizes color-coded springs 328 to determine nominal valve position values for each of multiple engine operating conditions. The nominal valve position values may correspond to the baseline valve position data 150 stored at the ECM module 106 of FIG. 1. Deviations from the nominal valve position values may be indicative of unsatisfactory PCV valve performance.

In the particular embodiment depicted in FIG. 3, three engine operating conditions are illustrated. It will be appreciated that alternative engine operating conditions may be selected for evaluation purposes. The three engine operating conditions depicted in FIG. 3 correspond to the first throttle position 202 (e.g., idle), the second throttle position 204 (e.g., acceleration), and the third throttle position 206 (e.g., cruising). During a calibration phase, the optical sensor 304 may utilize the color-coded springs 328 that pass through a viewing area 308 to determine a first nominal valve position 310 (designated as "P$_1$" in FIG. 3) at the first throttle position 202, a second nominal valve position 312 (designated as "P$_2$" in FIG. 3) at the second throttle position 204, and a third nominal valve position 314 (designated as "P$_3$" in FIG. 3) at the third throttle position 206.

Thus, FIG. 3 illustrates an example of a process of utilizing an optical sensor coupled to a PCV valve for PCV valve performance evaluation. In the particular embodiment depicted in FIG. 3, the optical sensor may identify color-coded springs that pass through a viewing area during transitions between various engine operating conditions. During the calibration phase, the transitions between color-coded springs may be utilized to determine nominal valve position values (or frequency information) for each of the engine operating conditions. The nominal valve position values may represent satisfactory PCV valve performance, with subsequent deviations from the nominal valve position values potentially representing unsatisfactory PCV valve performance.

Figure 4:
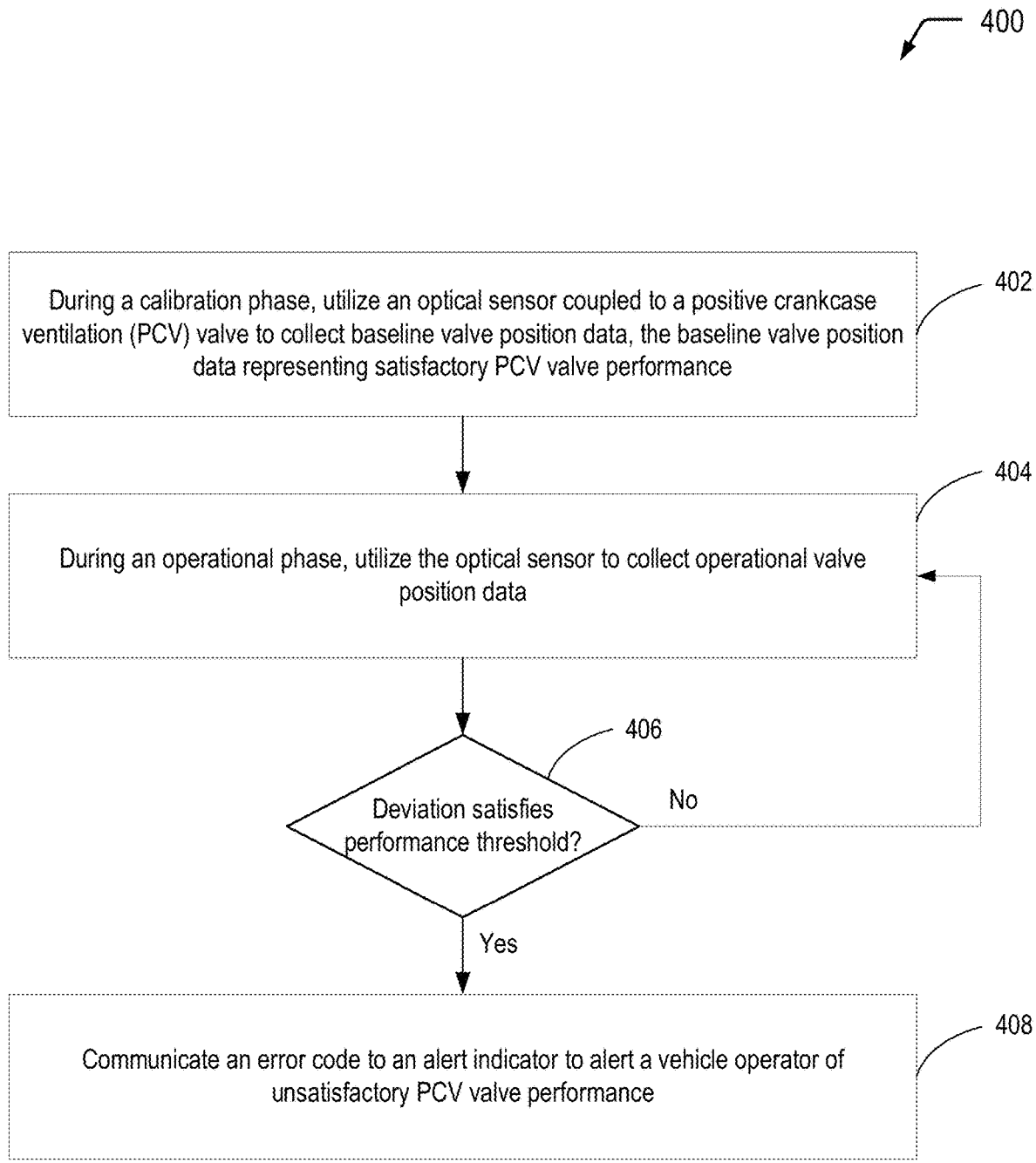
FIG. 4 is a flow diagram illustrating an example of a process of evaluating performance of a PCV valve, according to one embodiment.

Referring to FIG. 4, a flow diagram illustrates an example of a process 400 of evaluating performance of a PCV valve. In the particular embodiment depicted in FIG. 4, the process 400 includes communicating an error code to alert a vehicle operator to unsatisfactory PCV valve performance. Alternatively or additionally, the error code may be communicated (e.g., via a wired/wireless network) to another entity (e.g., a fleet maintenance company) such that the other entity may address the problem in a satisfactory timeframe to reduce the risk of engine damage.

The process 400 includes utilizing an optical sensor coupled to a PCV valve to collect baseline valve position data during a calibration phase, at 402. The baseline valve position data represents satisfactory PCV valve performance. For example, referring to FIG. 1, the optical sensor 104 coupled to the PCV valve 102 may collect the baseline valve position data 150 during a calibration phase. The ECM module 106 may store the baseline valve position data 150 in memory for subsequent comparison to the performance threshold(s) 154. In a particular embodiment, as illustrated and further described herein with respect to FIG. 2, the optical sensor 104 may determine relative valve position and/or frequency information based on the gradations 130 etched into the plunger 126. In another embodiment, as illustrated and further described herein with respect to FIG. 3, the optical sensor 104 may determine relative valve position and/or frequency information based on visual detection of the color-coded springs 328 within the viewing area 308.

The process 400 includes utilizing the optical sensor to collect operational valve position data during an operational phase, at 404. For example, referring to FIG. 1, the optical sensor 104 coupled to the PCV valve 102 may collect the operational valve position data 152 during an operational phase. In some cases, the operational phase may include data corresponding to the various throttle positions 202-206 depicted in FIGS. 2 and 3.

The process 400 includes determining whether a deviation of the operational valve position data from the baseline valve position data satisfies a performance threshold, at 406. The performance threshold is associated with unsatisfactory PCV valve performance. For example, referring to FIG. 1, the ECM module 106 may utilize the PCV evaluation logic 140 determine a deviation of the operational valve position data 152 from the baseline valve position data 150.

FIG. 4 illustrates that, when the deviation satisfies the performance threshold, at 406, the process 400 further includes communicating an error code to an alert indicator, at 408. The alert indicator may alert a vehicle operator of unsatisfactory PCV valve performance. When the deviation does not satisfy the performance threshold, at 406, the process 400 returns to 404, for continued collection of operational valve position data.

For example, referring to FIG. 1, the ECM module 106 may utilize the PCV evaluation logic 140 to determine whether the deviation of the operational valve position data 152 from the baseline valve position data 150 satisfies the performance threshold(s) 154. FIG. 1 illustrates that, when the ECM module 106 determines that the deviation satisfies the performance threshold(s) 154, the ECM module 106 may utilize the alert logic 142 to generate the error code 144. The error code 144 may be communicated to the alert indicator 146 (e.g., to alert a vehicle operator of unsatisfactory performance of the PCV valve 102).

Thus, FIG. 4 illustrates an example of a process of evaluating performance of a PCV valve. Unsatisfactory PCV valve performance (e.g., resulting from an oil separator failure) may represent a problem that does not manifest itself under easily identifiable conditions to a vehicle operator until damage has already occurred. Accordingly, the process of FIG. 4 may represent a way to predict and/or identify problems in the field and to provide an alert/warning to the vehicle operator.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A process of evaluating performance of a positive crankcase ventilation (PCV) valve, the process comprising:
during a calibration phase, utilizing an optical sensor coupled to a positive crankcase ventilation (PCV) valve to collect baseline valve position data, the baseline valve position data representing satisfactory PCV valve performance;
during an operational phase, utilizing the optical sensor to collect operational valve position data;
determining whether a deviation of the operational valve position data from the baseline valve position data satisfies a performance threshold associated with unsatisfactory PCV valve performance; and
when the deviation satisfies the performance threshold, communicating an error code to an alert indicator.

2. The process of claim 1, wherein the PCV valve includes a plunger having a plurality of surface gradations that are visually identifiable by the optical sensor.

3. The process of claim 2, wherein the plurality of surface gradations include surface etchings.

4. The process of claim 2, wherein individual surface gradations of the plurality of surface gradations are separated by an approximately similar distance along a plunger axis.

5. The process of claim 1, wherein the PCV valve includes a plurality of color-coded springs that are visually identifiable by the optical sensor.

6. The process of claim 1, wherein the alert indicator corresponds to a visual indicator.

7. The process of claim 6, wherein the visual indicator includes a graphical indicator of an engine problem, a textual indicator of an engine problem, or a combination thereof.

8. A positive crankcase ventilation (PCV) valve performance evaluation system comprising:
an optical sensor coupled to a positive crankcase ventilation (PCV) valve, the optical sensor configured to collect baseline valve position data during a calibration phase and to collect operational valve position data during an operational phase, the baseline valve position data representing satisfactory PCV valve performance; and
an engine control module (ECM) communicatively coupled to the optical sensor, the ECM configured to determine whether a deviation of the operational valve position data from the baseline valve position data satisfies a performance threshold associated with unsatisfactory PCV valve performance.

9. The PCV valve performance evaluation system of claim 8, wherein the ECM is further configured to communicate an error code to an alert indicator when the deviation satisfies the performance threshold.

10. The PCV valve performance evaluation system of claim 9, wherein the alert indicator corresponds to a visual indicator, an audible indicator, a tactile indicator, or any combination thereof.

11. The PCV valve performance evaluation system of claim 9, wherein the alert indicator includes a graphical indicator of an engine problem, a textual indicator of an engine problem, or a combination thereof.

12. The PCV valve performance evaluation system of claim 8, wherein the PCV valve has a not completely transparent housing, and wherein the optical sensor is disposed on an outer surface of the not completely transparent housing.

13. The PCV valve performance evaluation system of claim 8, wherein the PCV valve has an opaque housing, and wherein the optical sensor is disposed within an aperture in the opaque housing.

14. The PCV valve performance evaluation system of claim 8, wherein the calibration phase corresponds to an engine break-in period.

15. A crankcase ventilation system comprising:
a positive crankcase ventilation (PCV) valve; and
an optical sensor coupled to the PCV valve, the optical sensor configured to collect valve position data based on visually identifiable indicators associated with the PCV valve the optical sensor configured to collect baseline valve position data during a calibration phase and to collect operational valve position data during an operational phase, the baseline valve position data representing satisfactory PCV valve performance.

16. The crankcase ventilation system of claim 15, wherein the PCV valve has a not completely transparent housing, and wherein the optical sensor is disposed on an outer surface of the not completely transparent housing.

17. The crankcase ventilation system of claim 15, wherein the PCV valve has an opaque housing, and wherein the optical sensor is disposed within an aperture in the opaque housing.

18. The crankcase ventilation system of claim 15, wherein the PCV valve includes a plunger having a plurality of surface gradations that are visually identifiable by the optical sensor.

19. The crankcase ventilation system of claim 15, wherein the PCV valve includes a plurality of color-coded springs that are visually identifiable by the optical sensor.

20. The crankcase ventilation system of claim 19, further comprising an oil separator in fluid communication with the PCV valve, the valve position data to be utilized to determine whether performance of the oil separator is satisfactory.

\* \* \* \* \*